US010454815B2

United States Patent
Onno et al.

(10) Patent No.: US 10,454,815 B2
(45) Date of Patent: Oct. 22, 2019

(54) METHOD TO BE IMPLEMENTED AT A DEVICE CONFIGURED TO BE CONNECTED TO A CUSTOMER PREMISES EQUIPMENT OF A FIRST TYPE NETWORK, CORRESPONDING DEVICE

(71) Applicant: THOMSON Licensing, Issy-les-Moulineaux (FR)

(72) Inventors: Stephane Onno, Saint Gregoire (FR); Valerie Leguillon, Saint-Gregoire (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 10 days.

(21) Appl. No.: 15/789,994

(22) Filed: Oct. 21, 2017

(65) Prior Publication Data
US 2018/0115483 A1    Apr. 26, 2018

(30) Foreign Application Priority Data

Oct. 24, 2016 (EP) .................................... 16306388

(51) Int. Cl.
*H04L 12/28* (2006.01)
*H04L 12/725* (2013.01)
*H04L 12/741* (2013.01)
*H04L 12/813* (2013.01)
(Continued)

(52) U.S. Cl.
CPC .......... *H04L 45/306* (2013.01); *H04L 45/745* (2013.01); *H04L 47/20* (2013.01);
(Continued)

(58) Field of Classification Search
CPC ....... H04L 45/306; H04L 45/56; H04L 45/64; H04L 45/72; H04L 45/745; H04L 47/20;
(Continued)

(56) References Cited

U.S. PATENT DOCUMENTS 7,031,442 B1 * 4/2006 Neyman ........... H04M 3/42127
379/265.01
7,457,279 B1 * 11/2008 Scott ....................... H04L 45/02
370/352
(Continued)

FOREIGN PATENT DOCUMENTS

| CN | 103124233 | 11/2015 |
|---|---|---|
| JP | 2000253019 | 9/2000 |

(Continued)

OTHER PUBLICATIONS

Santos et al., "Software-Defined Networking Based Capacity Sharing in Hybrid Networks", 2013 21st IEEE International Conference on Network Protocols (ICNP), Goettingen, Germany, Oct. 7, 2013, pp. 1-6.

*Primary Examiner* — Minh Trang T Nguyen
(74) *Attorney, Agent, or Firm* — Joseph J. Opalach (57) ABSTRACT

A device configured to be connected to a customer premises equipment of a first type network. The first network includes at least one network apparatus in communication with the customer premises equipment and having a communication interface configured to receive capabilities information from the customer premises equipment and the at least one network apparatus, a routing application to define, based on the received capabilities information, one or several routing rules to route packets of the device. The routing rules identifying either the customer premises equipment or the at least one network apparatus to forward packets between the first type network and a second type network. The communication interface being further configured to send commands to enforce the defined routing rules either at the customer premises equipment or at the at least one network apparatus.

14 Claims, 3 Drawing Sheets

(51) Int. Cl.
*H04W 48/00* (2009.01)
*H04L 12/771* (2013.01)
*H04L 12/721* (2013.01)
*H04W 4/00* (2018.01)
*H04W 36/00* (2009.01)
*H04W 88/00* (2009.01)
*H04L 12/715* (2013.01)

(52) U.S. Cl.
CPC .............. *H04W 48/00* (2013.01); *H04L 45/56* (2013.01); *H04L 45/64* (2013.01); *H04L 45/72* (2013.01); *H04W 4/00* (2013.01); *H04W 36/00* (2013.01); *H04W 88/00* (2013.01)

(58) Field of Classification Search
CPC ....... H04W 36/00; H04W 48/00; H04W 4/00; H04W 88/00
See application file for complete search history.

(56) References Cited

U.S. PATENT DOCUMENTS

| | | | |
|---|---|---|---|
| 2009/0070229 A1* | 3/2009 | Ansari | G06Q 30/0601 705/26.1 |
| 2011/0081911 A1* | 4/2011 | Silver | H04L 12/66 455/445 |
| 2015/0063169 A1* | 3/2015 | Lu | H04L 12/282 370/254 |
| 2015/0163559 A1* | 6/2015 | Manchester | H04N 21/812 725/34 |

FOREIGN PATENT DOCUMENTS

| | | |
|---|---|---|
| JP | 2000307622 | 11/2000 |
| KR | 2015000152 | 1/2015 |
| WO | WO2005094008 | 10/2005 |

* cited by examiner

METHOD TO BE IMPLEMENTED AT A DEVICE CONFIGURED TO BE CONNECTED TO A CUSTOMER PREMISES EQUIPMENT OF A FIRST TYPE NETWORK, CORRESPONDING DEVICE

REFERENCE TO RELATED EUROPEAN APPLICATION

This application claims priority from European Patent Application No. 16306388.6, entitled "METHOD TO BE IMPLEMENTED AT A DEVICE CONFIGURED TO BE CONNECTED TO A CUSTOMER PREMISE EQUIPMENT OF A FIRST TYPE NETWORK, CORRESPONDING DEVICE", filed on Oct. 24, 2016, the contents of which are hereby incorporated by reference in its entirety.

TECHNICAL FIELD

The present disclosure generally relates to the network management and more particularly to routing algorithms.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The number of connected Consumer Electronics (CE) devices in residential home networks has increased drastically in recent years, so that the average number of connected devices was about seven devices per household in 2013. Some of these connected devices have mobile UMTS (or 3G) or LTE (or 4G) Internet access, with sometimes unlimited data plans. When arriving at home, users often connect their mobile devices to a wireless access point arranged at a home gateway and use the Internet access provided by said gateway (via a DSL, cable, or fiber connection), so that they do not use the spare capacities of their mobile accesses. In a household where several members have their own mobile phone, a huge amount of bandwidth can be unused, especially for those having LTE mobile connections.

There is then a need to provide routing algorithm to manage packets distribution through several Internet accesses provided by different devices.

SUMMARY

The disclosure concerns a method to be implemented at a device configured to be connected to a customer premises equipment of a first type network, said first network comprising at least one network apparatus in communication with said customer premises equipment, said method comprising:
  defining one or several routing rules to route packets of said device, based on capabilities information received from the customer premises equipment and said at least one network apparatus,
  sending commands to enforce the defined routing rules either at the customer premises equipment or at the at least one network apparatus,
said routing rules identifying either the customer premises equipment or said at least one network apparatus to forward packets between the first type network and a second type network.

Thus, thanks to the mentioned method, routing rules can be defined in a distributed manner by the devices and network apparatuses of the first network.

In one embodiment, routing rules can be defined, at the device, either automatically by a routing application or by user action through a management interface associated with the routing application.

In one embodiment, routing rules can be defined automatically by the routing application according to a type of targeted service and/or on available bandwidths.

In said embodiment, the routing rules can be determined regularly (for instance before the expiration of their associated time-period).

In one embodiment, the commands can be enforced by a routing server thanks to an Application Programming Interface service running at the customer premises equipment.

In one embodiment, each command to enforce a routing rule can comprise a source address, a destination address and a time-period during which the routing rule is in force.

In one embodiment, the device can run a routing application.

In one embodiment, the at least one network apparatus can comprise a device function, in communication with the customer premises equipment, and a gateway function to forward packets from the first type network to the second type network.

In one embodiment, the at least one network apparatus can run a routing application.

In one embodiment, when a routing rule is defined at the routing application of the network apparatus to forward packets from said network apparatus to its local gateway function, said routing rule can be enforced at the network apparatus.

In one embodiment, the routing application can be operated by the device function of the network apparatus.

In one embodiment, each of the customer premises equipment and the network apparatus can operate a gateway application configured to publish, on the first type network, capacities information to the device.

In one embodiment, the gateway application can be operated by the gateway function of the network apparatus.

In one embodiment, the first type network can be a Local Area Network and the second type network can be an access network.

In one embodiment, the capabilities information can comprise one or several of the following information:
  liveliness;
  available bandwidth;
  current bandwidth available for a given service;
  latency metrics;
  gateway service;
  device type,
  current network indicator.

In one embodiment, the device function of the at least one network apparatus can act as a device of the first type network.

The present disclosure also concerns a device configured to be connected to a customer premises equipment of a first type network, said first network comprising at least one network apparatus in communication with said customer premises equipment,
wherein said device comprises at least one memory and at least one processing circuitry configured to perform:

defining one or several routing rules to route packets of said device, based on capabilities information received from the customer premises equipment and said at least one network apparatus, sending commands to enforce the defined routing rules either at the customer premises equipment or at the at least one network apparatus, said routing rules identifying either the customer premises equipment or said at least one network apparatus to forward packets between the first type network and a second type network.

In addition, the present disclosure further concerns a device configured to be connected to a customer premises equipment of a first type network, said first network comprising at least one network apparatus in communication with said customer premises equipment, wherein said device comprises:

a communication interface configured to receive capabilities information from the customer premises equipment and said at least one network apparatus, a routing application to define, based on the received capabilities information, one or several routing rules to route packets of said device, said routing rules identifying either the customer premises equipment or said at least one network apparatus to forward packets between the first type network and a second type network, the communication interface being further configured to send commands to enforce the defined routing rules either at the customer premises equipment or at the at least one network apparatus.

In one embodiment, routing rules can be defined, at the device, either automatically by the routing application or by user action through a management interface associated with the routing application.

In one embodiment, routing rules can be defined automatically by the routing application according to a type of targeted service and/or on available bandwidths.

In one embodiment, each command to enforce a routing rule can comprise at least a source address, a destination address and a time period during which the routing rule is in force.

The present disclosure is also directed to a network apparatus comprising a device as previously mentioned equipped with a gateway function, further operating a gateway application configured to publish, on the first type network, capacities information.

Besides, the present disclosure is further directed to a non-transitory program storage device, readable by a computer, tangibly embodying a program of instructions executable by the computer to perform a method to be implemented at a device configured to be connected to a customer premises equipment of a first type network, said first network comprising at least one network apparatus in communication with said customer premises equipment, said method comprising:

defining one or several routing rules to route packets of said device, based on capabilities information received from the customer premises equipment and said at least one network apparatus, sending commands to enforce the defined routing rules either at the customer premises equipment or at the at least one network apparatus, said routing rules identifying either the customer premises equipment or said at least one network apparatus to forward packets between the first type network and a second type network.

The present disclosure also concerns a computer program product stored on a non-transitory computer readable medium and comprising program code instructions executable by a processor for implementing a method to be implemented at a device configured to be connected to a customer premises equipment of a first type network, said first network comprising at least one network apparatus in communication with said customer premises equipment, said method comprising:

defining one or several routing rules to route packets of said device, based on capabilities information received from the customer premises equipment and said at least one network apparatus, sending commands to enforce the defined routing rules either at the customer premises equipment or at the at least one network apparatus, said routing rules identifying either the customer premises equipment or said at least one network apparatus to forward packets between the first type network and a second type network.

The method according to the disclosure may be implemented in software on a programmable apparatus. It may be implemented solely in hardware or in software, or in a combination thereof.

Some processes implemented by elements of the present disclosure may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements of the present disclosure can be implemented in software, the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the method mentioned above.

Certain aspects commensurate in scope with the disclosed embodiments are set forth below. It should be understood that these aspects are presented merely to provide the reader with a brief summary of certain forms the disclosure might take and that these aspects are not intended to limit the scope of the disclosure. Indeed, the disclosure may encompass a variety of aspects that may not be set forth below.

BRIEF DESCRIPTION OF THE DRAWINGS

The disclosure will be better understood and illustrated by means of the following embodiment and execution examples, in no way limitative, with reference to the appended figures on which.

Wherever possible, the same reference numerals will be used throughout the figures to refer to the same or like parts.

DETAILED DESCRIPTION

The following description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided with dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In addition, it is to be understood that the figures and descriptions of the present disclosure have been simplified to illustrate elements that are relevant for a clear understanding of the present disclosure, while eliminating, for purposes of clarity, many other elements found in typical digital multimedia content delivery methods, devices and systems. However, because such elements are well known in the art, a detailed discussion of such elements is not provided herein. The disclosure herein is directed to all such variations and modifications known to those skilled in the art.

Figure 1:
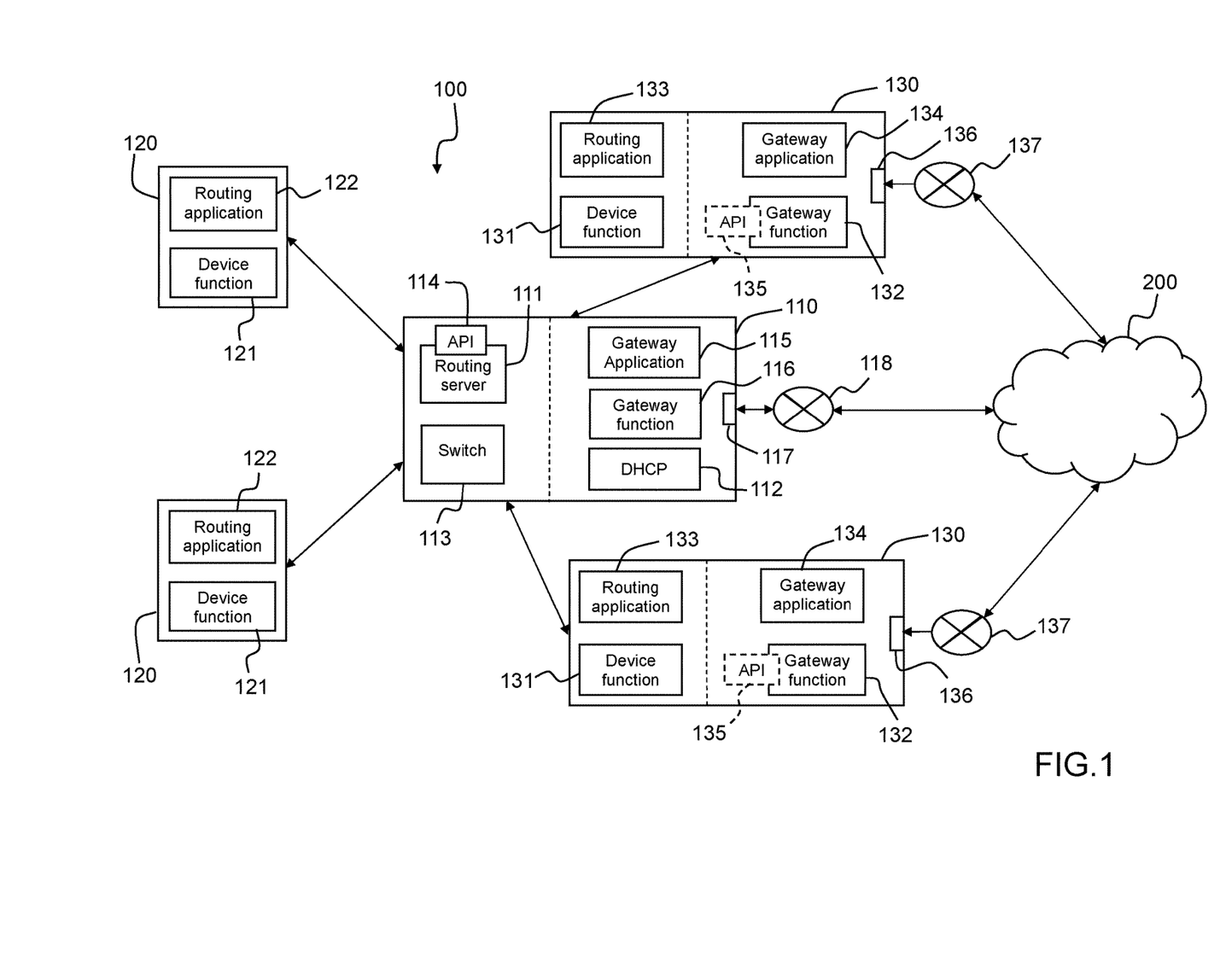
FIG. 1 is a schematic diagram of an exemplary network architecture of a home network to implement some embodiments of the present principles.

FIG. 1 is a schematic diagram of an example of an exemplary network architecture of a Local Area Network (or LAN) 100 (such as a home network or a business network) to implement some embodiments of the present principles.

As shown in FIG. 1, the LAN 100 can comprise a customer premises equipment (or CPE) 110, one or several devices 120 (two devices are represented in FIG. 1) and one or several network apparatuses 130 (two network apparatuses are represented in FIG. 1). The devices 120 and the network apparatuses 130 are connected to the CPE 110 with either a wired connection (e.g. Ethernet cable) or a wireless connection (e.g. a WiFi connection).

In the example of FIG. 1, to implement the present principles, the CPE 110 can comprise:

- a routing server 111 configured to translate commands (routing rules) received from devices 120 (thanks a routing Application Programming Interface (or API) service 114 described hereinafter) to a set of corresponding switching rules for a switch 113;
- a DHCP service 112 configured to provide IP addresses for a defined time period to devices 120 and/or network apparatuses 130 belonging to the home network 100,
- a switch 113 configured to forward packets from one interface of the home network 100 (e.g. an interface of a device 120 or network apparatus 130) to a further interface (e.g. associated with a broadband access network link) according to forwarding rules. The switch 113 is adapted to convert switching rules (received from the routing server 111) into a set of forwarding rules, corresponding to match/action rules applied on incoming packets (where the match is an arrangement of bits of the packet header and the action a forwarding decision). These forwarding rules can be stored within the switch 113 as forwarding tables. If an ongoing header packet matches with the match condition of the forwarding table, the switch 113 applies the related forwarding decision of the table entry, which can be forwarded to a particular address (e.g. address of the gateway function 132) or port (e.g. port that server the local gateway function of the CPE 116),
- a routing Application Programming Interface (or API) service 114,
- a gateway application 115 described hereinafter,
- a gateway function 116 to forward data packets from the LAN 100 to a Wide Area Network 200 (or WAN) (e.g. Internet) through an access network 118, and conversely,
- an interface 117 to an access network 118 in connection with the WAN 200.

In addition, in the example of FIG. 1, in order to implement the present principles, each device 120 can comprise a device function 121 and a routing application 122. In particular, a device function 121—which represents the behavior of the corresponding device—can comprise all the device applications that make use of the underlying network 100 to send traffic to the Internet through any gateway function. Device applications can be for example Web browser, video streaming application and the device function (the set of all windows/IOS/Android app). A device 120 can be, for instance, a portable media device, a tablet or a laptop, a TV set, a Set Top Box, a game device, etc.

As illustrated in the example of FIG. 1, each network apparatus can comprise a device function 131, a gateway function 132, a routing application 133, a gateway application 134, a routing API service 135 and an interface 136 to an access network 137 in connection with a WAN 200. In a variant, a network apparatus 130 can be devoid of any routing API service. A network apparatus 130 is a device 120 with a gateway function 132 to forward packets from the LAN 100 to the WAN 200, and conversely.

It should be noted that a network apparatus 130 corresponds to a device 120 with an additional gateway function 132 to provide access to a WAN 200. For example, a network apparatus can be a smartphone, a tablet or a laptop equipped with a broadband access connection (such as Edge, 3G or 4G connection).

For sake of clarity, some elements and/or functions of the CPE 110, devices 120 and network apparatuses 130 have been intentionally omitted in the example of FIG. 1.

Figure 2:
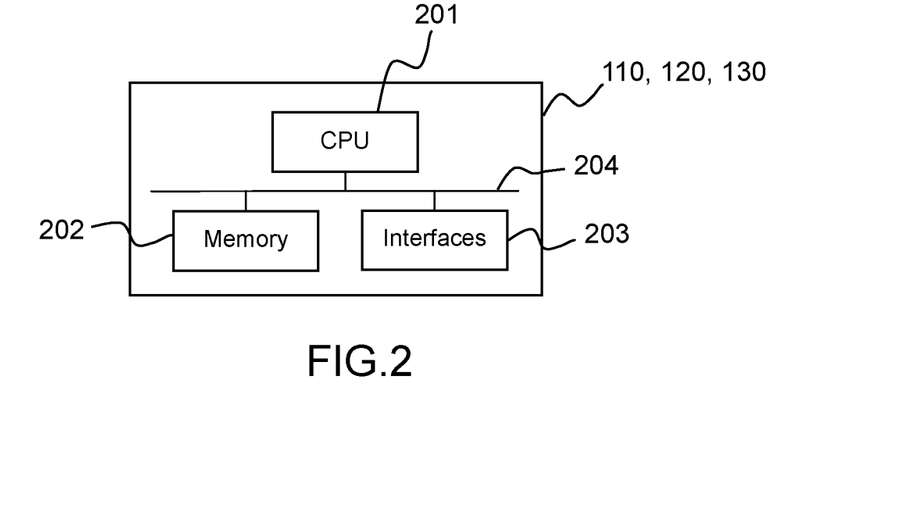
FIG. 2 shows an example of a hardware configuration of each device/apparatus/customer premises equipment of the home network of the FIG. 1, according to the present principles.

As shown in FIG. 2 depicting one example of a hardware configuration, each of the respective CPE 110, devices 120 and network apparatuses 130 can comprise a Central Processing Unit (CPU) 201 (comprising one or several processors), a memory 202 and one or several interfaces 203, connected together via a bus 204. The CPU 201 is configured for processing various data and for controlling various function and components of each of the respective CPE 110, devices 120 and network apparatuses 130. The memory 202 may represent both a transitory memory such as RAM, and a non-transitory memory such as a ROM, a hard drive or a flash memory, for processing and storing different files and information as necessary, including computer program products and software. Some of the above-mentioned functions and/or applications shown in FIG. 1 can be implemented by computer-readable programs stored in the memory 202. The interfaces 203 are used to communicate between the respective CPE/devices/apparatus 110, 120 and 130 via the LAN 100 through wired or wireless connection(s). Interfaces 203 can further comprise user input and/or output elements (e.g. a touch panel, a display screen, a keyboard, a remote control, etc.)

In one embodiment, a gateway application 115, 134 of the CPE 110 or network apparatus 130 can allow a user to control and configure the corresponding gateway function 116, 132. A gateway application can be launched by a user of the CPE 110 or network apparatus 130. In a variant, the gateway application can be activated when the CPE or network apparatus is powered on.

For instance, a user (or owner) of a network apparatus 130 can decide whether or not he/she wants to share the access network 137 associated with his/her network apparatus 130. In addition, a user can further decide that the local Internet traffic always flows through the access network 137 associated with his/her network apparatus 130, without transiting through the switch 113 of the CPE 110. Otherwise, Internet traffic could flow to the switch 113 which will manage its Internet traffic like any device/network apparatus of the LAN 100. In that case, the switch 113 can decide to forward traffic to another access network such as the access network 118 associated with the CPE 110.

It should be understood that a routing API service 135 of a network apparatus 130 is only configured to receive command(s) from the gateway application 134 of said network apparatus (comprising the considered routing API service 135) in order to use the corresponding gateway function 132 for processing the local Internet traffic. In a variant or complement, such a command concerning the routing of the local Internet traffic can come from the routing application 133 of the considered network apparatus 130, instead of the gateway application 134.

Figure 3:
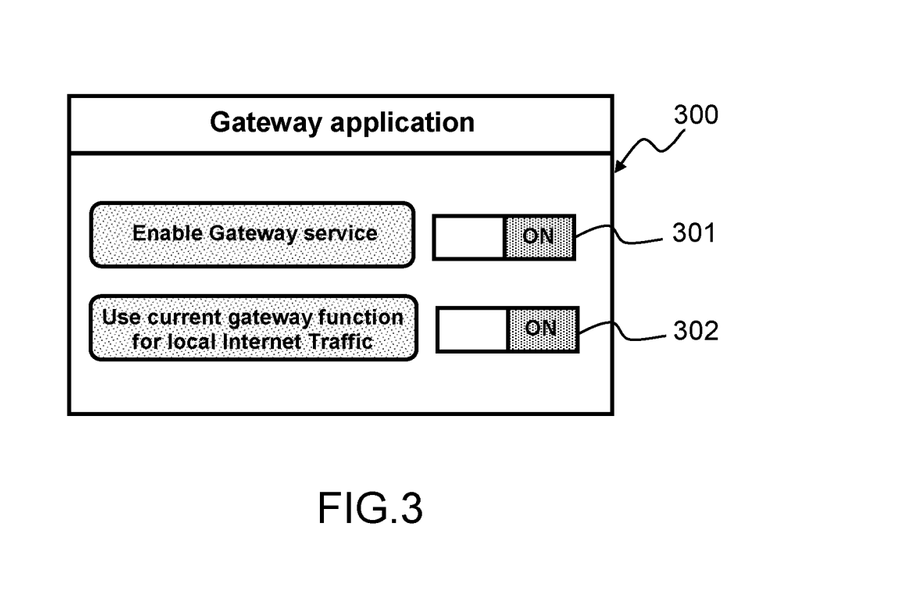
FIG. 3 depicts an example of a management interface of a gateway application operated at a network apparatus according to the present principles.

FIG. 3 shows an illustrative but non limitative example of a management interface 300 of a gateway application 134 wherein a user of the corresponding network apparatus 130 is able to activate its gateway function 132 by moving a dedicated button 301. In addition, with a further button 302, the user can be allowed to decide that the local Internet traffic of his/her network apparatus 130 will transit, or not, through the switch 113 of the CPE 110. In a variant, the gateway function can be configured to automatically parse and forward the local traffic from (or to) the corresponding device function to the associated network access 137, without being redirected to the switch 113 of the CPE 110.

Besides, every gateway application 115, 134 (once activated) can publish its capabilities information on the LAN 100, through a communication channel. The routing applications 122 of the devices 120 and network apparatuses 130 of LAN 100 can subscribe, for instance, to a publication implemented by the gateway applications 115 and 134 in order to receive their capabilities information. In one embodiment, the publish/subscribe process can be implemented at an applicative layer (e.g. http) and be based on the Redis protocol (implementing the Redis Pub/Sub paradigm) or on a notification service from an operating system (such as Android or IOS). In another embodiment, the publish/subscribe process can be implemented at a network layer and can rely on a service discovery protocol (e.g. the Simple Service Discovery Protocol or SSDP, or the DNS Service Discovery with mDNS proposed by Apple).

In addition, the capacities information can comprise:
liveliness of gateway function;
available bandwidth on the corresponding access network 118, 137. The CPE 110 and the network apparatuses 130 can passively or dynamically check the available bandwidth;
current bandwidth available for a given service (such as gaming, video, voice);
average bandwidth event indication (e.g. a bandwidth decrease due to a poor quality of reception):
reserved bandwidth for the local network apparatus or another network apparatus meaning only part of the total bandwidth can be available for other device. This can for instance ensure that the local device will not suffer of bandwidth congestion of its own bandwidth while sharing it to any other device;
remaining data spent or available on the mobile data plane to inform other routing applications not to go over the limited data plane of the mobile;
latency metrics;
gateway status;
apparatus type (e.g. DSL, 3G, 4G, etc.);
Identification Operator name of the apparatus;
data plane alerts to inform other routing applications that, due to traffic, a threshold of the limited data plane of the mobile is reached (e.g 80% of the 10 Gbs/month data plane);
the operating system implemented by the CPE or network apparatus;

current network indicator (corresponding for instance to the indicators representing the quality of "Edge", "3G" or "4G" reception);

list of current or new connected devices/network apparatuses

By default, for a given device 120 or network apparatus 130 (having a device function 131), the switch 113 of the CPE 110 can be configured to route packets coming from this given device/network apparatus to the access network interface 117 of the CPE 110 to access WAN 200. In that case, the gateway function 116 of the CPE 110 is considered as a default gateway.

A user of a device 120 or network apparatus 130 can launch the associated routing application 122, 133 for selecting alternative access gateways to connect to the Internet 200. In a variant, the routing application 122, 133 can be activated when the device/apparatus is powered on.

After subscription, the routing application of the devices 120 and the network apparatuses 130 can receive capacities information from the various gateway applications 115, 134 of the CPE 110 and the network apparatuses 130, when the gateway function 116, 132 is operative and the corresponding gateway application 115, 133 is activated.

In one embodiment, based on the received capacities information published by the gateway applications 115 and 134, a routing application 122, 133 can automatically define one or several routing rules to route the data packets (e.g. Internet traffic) of the corresponding device 120 or network apparatus 130 between LAN 100 and WAN 200. The definition of the routing rules by the routing application can for instance rely on a default gateway failover mode by automatically routing to the first alternate gateway function 118, 137 in case of failure of a default gateway function (e.g. the gateway function 116 of the CPE 110). The determination of the first alternate gateway function 118, 137 can take into account a bandwidth estimation (e.g. by considering the quality of reception of "Edge", "3G", "4G" connection). In a complement or in a variant, the routing application 122, 133 can consider the targeted services. For instance, gaming services and video calling—which require an appropriate latency—can be associated with mobile connection (such as "edge", "3G", "4G" connection) of network apparatuses 130 when it exists or when such mobile connection becomes available in LAN 100 (e.g. a new network apparatus 130 is just attached to the LAN 100). When a new mobile connection becomes available, a routing rule can allow switching from one defined gateway function (e.g. the default gateway) to the gateway function of the network apparatus 130 providing this new mobile connection. For video services, the routing application 122, 133 can for instance establish a routing rule involving the gateway function of the CPE 110 with a limit of remaining data plane not exceeding a given threshold (e.g. 50% of the allocated data plane), notably by considering data plane alerts. In a further variant or complement, the routing application 122, 133 can define routing rules according to the gateway function offering the best available bandwidth amongst gateway functions 116 and 132 of the LAN 100. It should be noted that routing rules from one device can involve several gateway functions depending on the type of traffic (e.g. video traffic towards 4G, HTTP traffic towards DSL).

In another embodiment, the routing application of a given device/network apparatus can consider the routing rules of the other devices and network apparatuses of the LAN 100. For instance, when a first device 120 has defined a routing rule to route packets to a given gateway function (e.g. DSL) and when a new device 120, 130 arrives on the LAN 100 with a routing rule using the same given gateway function (DSL), the routing application of the first device 120 can decide to modify its routing rule accordingly (e.g. by selecting another gateway function of the LAN 100).

Figure 4:
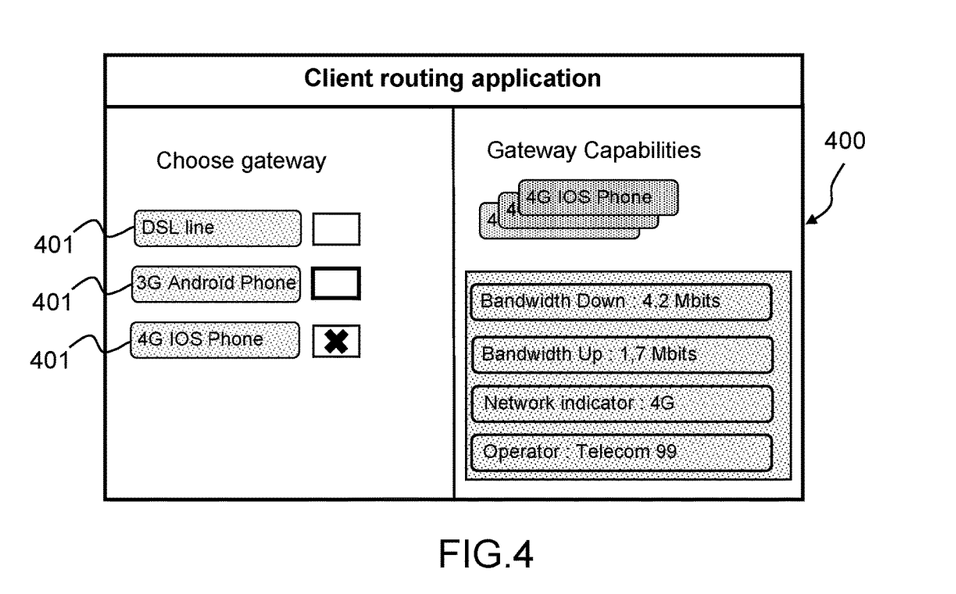
FIG. 4 is an example of a management interface of a routing application operated at a device according to the present principles.

In a further embodiment, routing rules can be defined by a user of the device 120/network apparatus 130 from a management interface 400 (such as a user interface displayed on a screen of the device/apparatus). In that case, the user can assess the capabilities of the gateway functions by him/herself.

Whatever the type of definition (either automatically or manually), a priority can be associated with each routing rule, said priority being considered and processed by the routing server 111.

As shown in the example of FIG. 4, the management interface 400 can offer to the user the possibility to select the desired gateway function 116 based, for instance, on the gateway capabilities displayed on the interface 400 (only some gateway capabilities are shown in FIG. 4 for clarity reasons). In a complement or refinement (not shown in FIG. 4), some routing rules can be predefined depending on the type of targeted services (e.g. video, gaming, video calling). For example, a 4G gateway function can be preselected to forward data packets of a gaming service or voice service, whereas a streaming service can be already associated with a DSL gateway function. In a further complement or refinement, the user can select a preferred order list of available gateway functions (e.g. DSL/Fiber/Cable, a $1^{st}$ mobile phone, a $2^{nd}$ mobile phone, etc.). Thus, with reference to FIG. 4, instead of ticking the box 401 associated with a desired gateway function, the user can build a preferred order list of gateway functions by dragging the corresponding boxes 401 of gateway functions. In that case, the corresponding routing application 122, 133 can further define routing rules by taking into account the established preferred order list of gateway functions.

In an embodiment, whatever the type of definition (either automatically or manually), the routing rules can be regularly defined (e.g. on a time-period basis corresponding to the validity of a rule) by the routing application 122, 132. This can ensure that the switch 113 will recover its original state after the end of time-period. To this end, the routing server 111 can impose a maximal time-period for each new routing rule so that the routing application should renew the routing rule before this time-period has elapsed. For instance, the maximal time-period can be requested by the routing application of each device through the routing API service 114 of the routing server 111 (e.g. via a GET request). Upon manual entry, the routing application can renew the routing rule automatically (in the background) before expiration of the defined time-period. A new routing rule can also automatically replace an old one when the match header is the same in order to avoid deleting a routing rule before sending a new one.

When a routing rule has been defined either automatically or manually by the routing application of a device 120 or network apparatus 130, the routing application 122, 133 can send an API request (or command) towards the routing server 111 of the CPE 110 through the API service 114. The routing server 111 checks the consistency of the request including semantic checking (e.g. uncorrect request) and consistency checking (i.e. whether or not the rule can be applied with respect to other pending rules). When a rule is consistent, the routing server 111 enforces the defined routing rule at the switch 113 by converting the API request into switching rules for the switch 113 which further converts the received switching into forwarding rules. The API request can rely on the REST (Representational State Transfer) architecture using HTTP protocol characteristics. For instance, the API request, sent by a routing application 122, can be a tuple comprising at least the source device/apparatus (e.g. its MAC address and/or IP address), the selected gateway function (e.g. Mac Address and/or IP address of the CPE 110 or network apparatus 130) and a timing period during which the routing rule is in force (e.g. http:/server/set-simple-rule-by-ip-device/{IP device}/{IP gateway}/{time period}).

Upon receipt of an API request by the routing API service 114, the routing server 111 of the CPE 110 can enforce the routing rule at the switch 113 to route the incoming traffic towards the selected gateway function. Similarly, on the reverse path, another rule can be created for steering packets coming from the selected gateway function towards the corresponding device/network apparatus.

In an embodiment, the routing server 111 can make use of linux netfilters based tool, such as iproute2 (ip rules, ip route), iptables and connection tracking features to enforce the policy and the routing rules at the switch 113. By default, the routing server 111 can be already configured with a set of netfilter rules to ensure firewalling and basic routing policies at startup. Upon reception of a new routing request coming from a routing application 122, the routing server 111 can create a new set of specific ip rule and ip tables, mark packets coming from the device/network apparatus so that incoming packets matches the ip rule and within the ip rule creates an ip route towards the selected gateway. ipset is an advanced netfilter tool able to set a timeout value on each ip rule and update the rule with a new timeout. The routing server can convert high level routing application rules to a set of consistent netfilters rules to populate the forwarding table of the switch 113. In another embodiment, the switch can be an Openflow switch configured to receive, from the routing server, Openflow rules (switching rules) according to an Openflow protocol in order to enforce them.

Routing server 111 can check the overall rules consistency before enforcing the new rule. For instance, if a previous routing rule exists, the routing server 111 can update the routing rule by removing the previous one. In addition, the enforced routing rules should be well written and should be removed when the device 120 or network apparatus 130 is not connected to the LAN 100 anymore. When a selected gateway function 116, 132 becomes unreachable (e.g. gateway service off message is sent, unexpected unavailability, etc.), the routing application 122, 133 can ping the gateway function to check the connectivity and, without any response, can automatically send a "Remove&Update" API request to the routing server 111 through the routing API service 114 to set a new routing rule using the default gateway function (e.g. the gateway function of the CPE 110). The user of the corresponding device/network apparatus can be informed of this change of routing rule via the management interface 400.

In a further embodiment, one of the devices 120 and network apparatuses 130 can be considered as a master device, the other devices/network apparatuses being slave devices. The master device can be configured to receive routing rules from the slave devices and to send command to the CPE 110 to enforce its own routing rules and the received routing rules from the slave devices. In that embodiment, the master device can be able to amend routing rules defined by slave devices and to inform them of such amendments.

Figure 5:
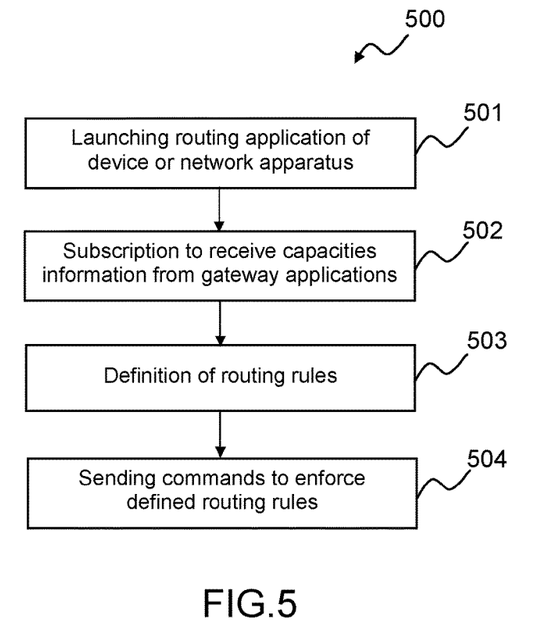
FIG. 5 is a flow chart of an exemplary method used by some embodiments according to the present principles.

FIG. 5 is a flow chart depiction illustrating an embodiment where a method 500 for defining routing rules, at device 120 or a network apparatus 130, is provided.

At step 501, a routing application 122, 133 stored in the device 120 or network apparatus 130 can be launched, either manually upon user's action or automatically when the device/apparatus is powered on.

At step 502, the routing application 122, 133, once activated, can subscribe to the publication of capacities information operated by the gateway applications 115 and 134 of the CPE 110 and network apparatuses 130. Such a subscription allows the device/apparatus to receive capabilities information of gateway functions of the LAN 100.

At step 503, a user can define routing rules for routing data packets associated with the considered device/apparatus, based on the capacities information received. In a variant, the routing rules can be automatically defined as previously described. A preferred order list of gateway functions can also be built by the user, said order list being further processed by the routing application 122, 133.

At step 504, once the routing rules are defined either manually or automatically, the routing application 122, 133 can send one or several commands to the routing API service 114 of the CPE 110. Then, the commands can be executed by the routing API service 114 of the CPE 110 to enforce the routing rules defined at 503.

Thanks to the present principles, it is contemplable, for instance, to manage whole access links to the Internet at home for increasing the overall Quality of Experience (QoE) for members of a household. The following household use cases illustrate some possible embodiments according to the present principles with the definition of appropriate routing rules:

- if both dad's device and son's device are connected in a home network and two Internet access links are available from these devices, the son's device traffic can flow to a mobile Internet access to use the full broadband bandwidth of dad;
- if the son's device is used for gaming while the dad's device is used for streaming, the son's device traffic can flow to one of the Internet access links with a lower latency while the dad's device traffic can flow to another access link of the available Internet access links providing a higher bandwidth;
- a UMTS mobile phone used for streaming traffic can be redirected to a LTE mobile phone access link and conversely, i.e., LTE mobile Web traffic can be redirected to a UMTS mobile access link.

In the Figures, it is to be appreciated that the illustrated blocks or modules can correspond to functional modules, which may or may not correspond to distinguishable physical units. For example, a plurality of such modules may be associated in a unique component or circuit, or correspond to software functionalities. Moreover, a module may potentially be composed of separate physical entities or software functionalities.

References disclosed in the description, the claims and the drawings might be provided independently or in any appropriate combination. Features may be, where appropriate, implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

Although certain embodiments only of the disclosure have been described herein, it will be understood by any person skilled in the art that other modifications, variations, and possibilities of the disclosure are possible. Such modifications, variations and possibilities are therefore to be considered as falling within the spirit and scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

The invention claimed is:

1. A method to be implemented at a device configured to be connected to a customer premises equipment of a first type network, said first type network comprising at least one network apparatus in communication with said customer premises equipment,
said method comprising:
defining one or several routing rules to route packets of said device, based on capabilities information received from the customer premises equipment and said at least one network apparatus, and
sending commands to enforce the defined routing rules either at the customer premises equipment or at the at least one network apparatus,
said routing rules identifying either the customer premises equipment or said at least one network apparatus to forward packets between the first type network and a second type network.

2. The method according to claim 1, wherein routing rules are defined, at the device, either automatically by a routing application or by user action through a management interface associated with the routing application.

3. The method according to claim 2, wherein routing rules are defined automatically by the routing application according to a type of targeted service and/or on available bandwidths.

4. The method according to claim 1, wherein the commands are enforced by a routing server thanks to an Application Programming Interface service running at the customer premises equipment.

5. The method according to claim 1, wherein each command to enforce a routing rule comprises at least a source address, a destination address and a time period during which the routing rule is in force.

6. The method according to claim 1, wherein the device runs a routing application.

7. The method according to claim 1 wherein the network apparatus runs a routing application.

8. The method according to claim 1, wherein each of the customer premises equipment and the network apparatus operates a gateway application configured to publish, on the first type network, capacities information to the device.

9. A device configured to be connected to a customer premises equipment of a first type network, said first type network comprising at least one network apparatus in communication with said customer premises equipment,
wherein said device comprises:
a communication interface configured to receive capabilities information from the customer premises equipment and said at least one network apparatus, and
a routing application to define, based on the received capabilities information, one or several routing rules to route packets of said device, said routing rules identifying either the customer premises equipment or said at least one network apparatus to forward packets between the first type network and a second type network,
the communication interface being further configured to send commands to enforce the defined routing rules either at the customer premises equipment or at the at least one network apparatus.

10. The device according to claim 9, wherein routing rules are defined, at the device, either automatically by the routing application or by user action through a management interface associated with the routing application.

11. The device according to claim 10, wherein, when routing rules are defined automatically by the routing application according to a type of targeted service and/or on available bandwidths.

12. The device according to claim 10, wherein each command to enforce a routing rule comprises at least a source address, a destination address and a time period during which the routing rule is in force.

13. A network apparatus comprising a device according to claim 9 equipped with a gateway function, further operating a gateway application configured to publish, on the first type network, capacities information.

14. A computer program product stored on a non-transitory computer readable medium and comprising program code instructions executable by a processor for implementing a method to be implemented at a device configured to be connected to a customer premises equipment of a first type network, said first network comprising at least one network apparatus in communication with said customer premises equipment, said method comprising:
defining one or several routing rules to route packets of said device, based on capabilities information received from the customer premises equipment and said at least one network apparatus, and
sending commands to enforce the defined routing rules either at the customer premises equipment or at the at least one network apparatus,
said routing rules identifying either the customer premises equipment or said at least one network apparatus to forward packets between the first type network and a second type network.

* * * * *